Feb. 27, 1968          R. S. SHEVELL ET AL          3,370,810
                STALL CONTROL DEVICE FOR SWEPT WINGS
Filed Feb. 1, 1966                              2 Sheets-Sheet 1

INVENTORS
RICHARD S. SHEVELL
ROGER D. SCHAUFELE
ROBERT L. ROENSCH
BY
-AGENT-

Feb. 27, 1968 R. S. SHEVELL ET AL 3,370,810
STALL CONTROL DEVICE FOR SWEPT WINGS
Filed Feb. 1, 1966 2 Sheets-Sheet 2
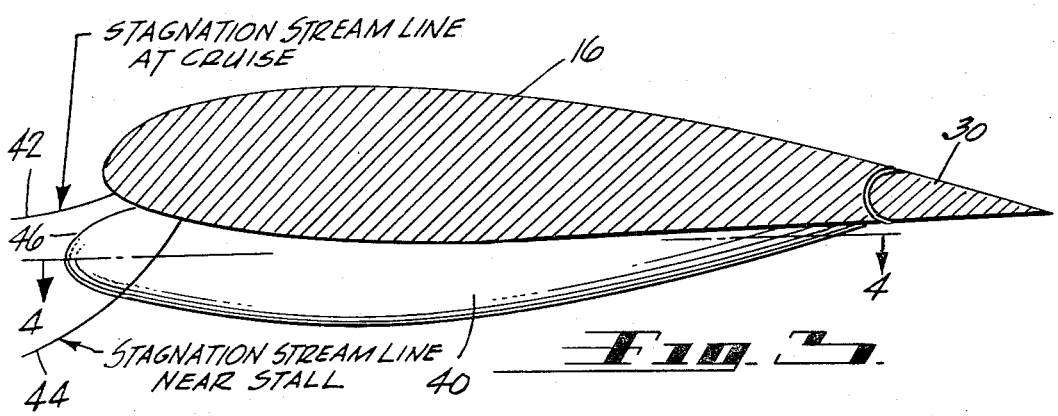
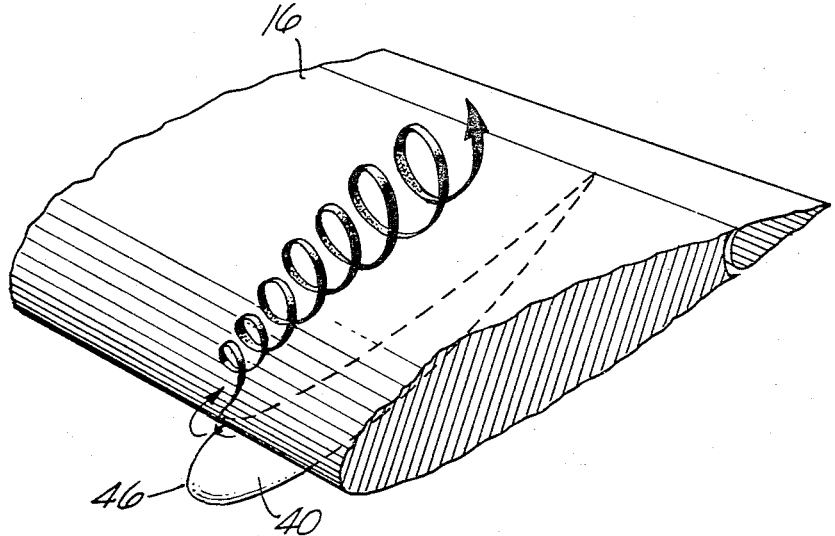
INVENTORS
RICHARD S. SHEVELL
ROGER D. SCHAUFELE
ROBERT L. ROENSCH
BY
- AGENT -

3,370,810
STALL CONTROL DEVICE FOR SWEPT WINGS
Richard S. Shevell, Los Angeles, and Roger D. Schaufele and Robert L. Roensch, Santa Ana, Calif., assignors, by mesne assignments, to McDonnell Douglas Corporation, Santa Monica, Calif., a corporation of Maryland
Filed Feb. 1, 1966, Ser. No. 524,024
3 Claims. (Cl. 244—41)

ABSTRACT OF THE DISCLOSURE

A device for use to decrease the possibility of stall in an aircraft having an aerodynamic-airfoil body which is completely located on the underside of an aircraft wing. The body must be substantially hollow and have a length of at least 50% of the chord length of the wing. The nose of the device must extend forward of the wing leading edge sufficiently to intersect the air stagnation streamline near aircraft stall.

The present invention relates to aircraft and more specifically to an apparatus for improving the aerodynamic characteristics of aircraft wings, with particular reference to wings of a swept-back variety.

In the operation of aircraft, it is desirable to maintain a minimum aerodynamic drag and to have available a high maximum lift capability over substantially the entire anticipated range of speed of the aircraft. As the normal cruise speed of such aircraft is substantially higher than that encountered in landing operations, wing surfaces which are intended to maintain a high efficiency at high speeds will normally be less efficient at low speeds. In order to improve wing efficiency for flight at high subsonic Mach number, swept-back wings have been employed. While such swept-back wings are advantageous for flight speeds approaching Mach one, the swept-back configuration has certain disadvantages. The most noticeable disadvantage is that it is difficult to obtain satisfactory stall characteristics.

Satisfactory stall characteristics are obtained when there is an inherent nose down rotation of the aircraft immediately following the stall without excessive roll. The desired stall characteristics for swept-back wings are obtained when the root portion of the wing stalls prior to the tip. If the tip stalls prior to the root of the wing, "pitch-up" occurs. "Pitch-up" refers to the spontaneous rising of the nose of the aircraft which is not a result of pilot control but rather is caused by the force moment created from the loss of lift at the wing tips. If excessive such pitch-up occurs, it can result in the complete loss of control of the aircraft.

There are two fundamental reasons why swept wing aircraft tend to exhibit wing tip stall. One cause is the higher lift coefficient developed at the wing tip. Aircraft designers attempt to minimize this by the use of wing twist. The other cause is the flow of the boundary layer from the root to the tip. This span-wise flow tends to diminish the boundary layer thickness inboard, thereby increasing the maximum lift capability of the root section, but, increasing the boundary layer thickness outboard and thereby decreasing the maximum lift capability of the tip section.

When landing an aircraft, it is obvious that stall before the landing gear contacts the ground is extremely hazardous. Therefore, the aircraft is usually landed at a speed above the stall speed. However, it is desired to maintain landing speed as low as possible to allow the aircraft to land in the shortest distance possible. If the aircraft exhibits excessive "pitch up" at the stall, the landing speed will be further increased. Therefore, a means to eliminate or decrease the unsatisfactory stall characteristics is extremely desirable.

Present methods of solution include slats, slots, leading edge flaps, leading edge fences or large pylons. The pylons act as leading edge fences although their basic purpose is to support the aircraft engines. Movable leading edge devices are heavy and complex. Leading edge fences seriously decrease maximum lift coefficients and increase aerodynamic drag at cruising speeds.

The apparatus of the present invention relates to a lower surface fence-like device which generates a vortex of relatively high strength when the aircraft approaches stall. It differs from previous devices (which appear similar to the device herein but are intended for a variety of different purposes) in that it lies entirely on the undersurface of the aircraft wing and its leading edge intersects the wing slightly ahead of the stagnation point at stall. Its design has no adverse effect on the maximum lift capability of the aircraft while still inducing full effectiveness of the device beyond stall. Furthermore, by being on the undersurface only, it minimizes drag losses during the normal flight regime of the aircraft. It is also desirable that the nose of the device project forward of the intersection of its leading edge and the wing undersurface, thereby differentiating this device from prior similarly appearing structures.

The present invention has a substantially airfoil configuration to minimize the aerodynamic drag of the device. The apparatus has a functional characteristic to avoid blocking of lateral air movement on the upper wing surface while still functioning to create vortex air currents which flow opposite to the direction of the lateral air movement in the boundary layer, thereby counteracting such movement. Before entering into the detailed explanation of the apparatus of this invention, a brief discussion of the development history is appropriate.

Different types of aircraft present different aerodynamic characteristics and problems of effective operation and control. While the device of this invention has been developed for use primarily on so-called T tail types of aircraft, it may be used to advantage on other types of aircraft. The device is airfoil shaped and mounted on the underside of each aircraft wing. It has been found that not just any shape, size or placement of the device will create the desired effect. For instance, a thin device (substantially planar) was found to be inoperative, but, a device having a greater thickness (on the order of one-half the wing thickness) operated satisfactorily. Also, the chord of the device must be on the same order as the chord of the wing to be operable, as a device of shorter length proved inoperative. Further, it has been discovered that optimum placement of the device was at a point which is approximately one-fourth to one-third of the semi-span of the wing. Although the exact reasons for the device's operation under the certain size, shape and placement specifications are not proven, many hypotheses have been presented, but are not necessary in the description of the invention.

The above introduction states the general objectives of the invention and presents a brief summary of the problems for which the invention provides a solution. Further objects of the invention, and a better understanding of the details thereof, may be obtained in the annexed description taken in conjunction with the drawings wherein:

FIG. 3 is a sectional view taken along line 3—3 of FIG. 2;

FIG. 4 is a sectional view of the invention showing its airfoil shape and taken along line 4—4 of FIG. 3; and FIG. 5 is a pictorial view of the invention as installed.

Figure 1:
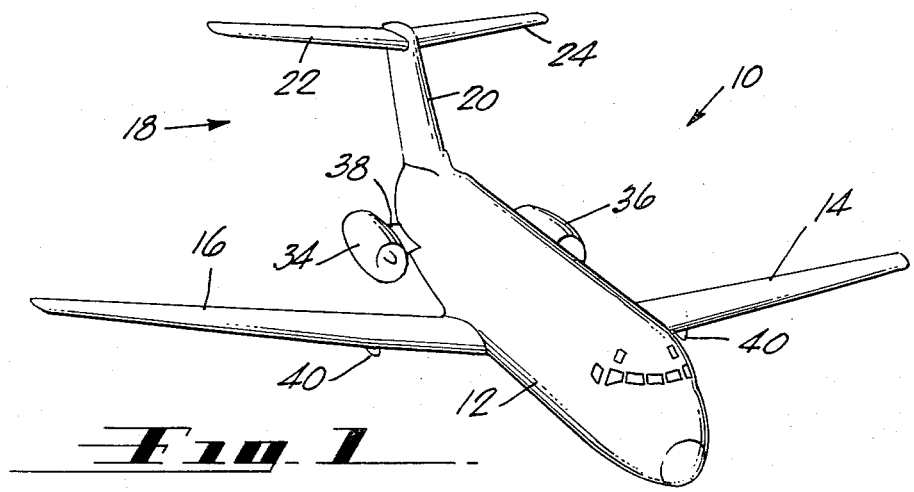
FIGURE 1 is a pictorial view of an aircraft showing placement of this invention.
Figure 2:
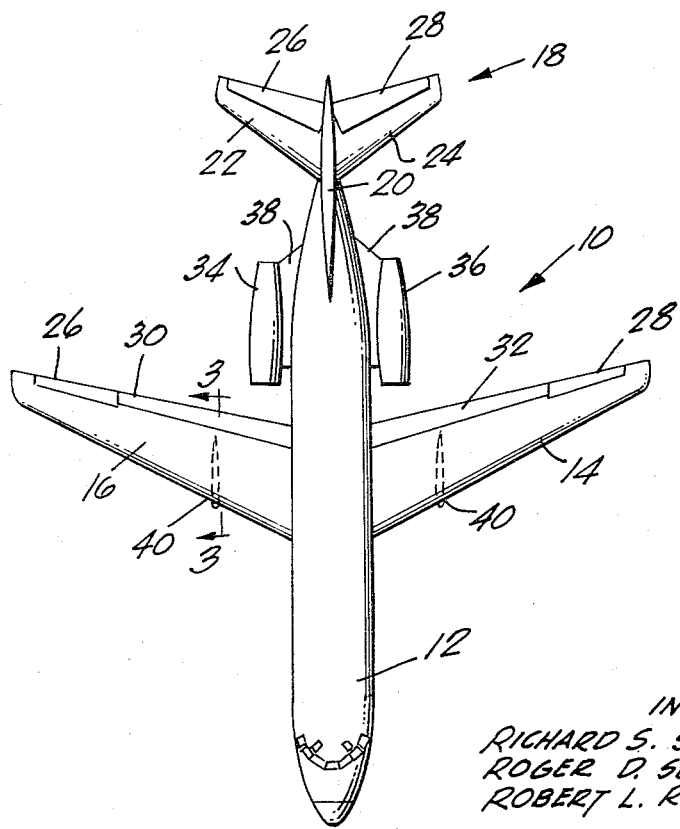
FIG. 2 is a top plan view of the aircraft of FIG. 1 showing this invention in dotted lines.

A T tail type of aircraft employing the instant invention is shown in FIGS. 1 and 2. Aircraft 10 has a fuselage 12, wings 14 and 16 and an empennage 18. The empennage 18 is of the T tail configuration having a vertical stabilizer 20 and horizontal stabilizers 22 and 24. Located at the trailing edge of each horizontal stabilizer 22 and 24 are conventional elevators 26 and 28, respectively. Wings 14 and 16 each incorporate at their trailing edges conventional ailerons 26 and 28 and flaps 30 and 32, respectively. Two engines 34 and 36 are located near the rear of the fuselage and mounted thereon by means of pylons 38. Located on the underside of each wing 14 and 16 is the device 40 of this invention.

With particularity note FIG. 3. Lines 42 and 44 are shown representing the stagnation stream-line at cruise and the stagnation stream-line at stall, respectively. When the air passes over the wing from the direction of line 42, the aircraft is cruising. When the air passes over the wing from the direction of line 44, the aircraft is approaching stall. It should be noticed that the nose 46 of the device 40 extends ahead of line 44, but short of line 42. Such extension of the nose 46 is a necessary feature as will be explained further. As the aircraft is decreasing speed and approaching stall, the stagnation streamline intersects the wing behind front portion 24. Because of the swept back shape of the wings, the air pressure tends to increase on the side of the device 40 nearest the fuselage and decrease on the opposite side. The resultant pressure difference creates a vortex which passes over the upper surface of the wing. This vortex rotates in a clockwise direction on the upper surface of the starboard wing and counterclockwise on the upper surface of the port wing (looking from the rear of the aircraft) note FIG. 5) and passes over the wing in such a manner as to create air currents near the surface of the wing which are opposite to the boundary layer flow toward the wing tip. It has been found that such a vortex is of a relatively high strength and adequately prevents wing tip stall.

It has been discovered that the device 40 also effects the air which passes over the empennage. It is well-known that the fuselage of an aircraft, at angles of attack associated with stall, create vortices (one on each side of the fuselage) in areas of the tail portion of an aircraft. These vortices may decrease the control capabilities of an aircraft particularly with the use of a T tail type of aircraft in which the vortices pass beneath the horizontal stabilizers. Employment of the device 40 not only increases the aerodynamic characteristics of the wings, but also the vortices created pass under the horizontal stabilizers in such a manner as to counteract the effect of the fuselage vortices and thereby increase aircraft control. For this reason, optimum placement of the device 40 was discovered to be approximately in-line with the tip of the horizontal stabilizers. However, such placement would vary with other types of T tail aircraft or with conventional types of aircraft. Optimum placement is to be determined strictly by experimentation.

It is to be understood that it may be desirable to employ a plurality of the devices under each aircraft wing, especially in conventional aircraft or in larger aircraft. The number to be employed, size of the device or the particular placement of the device with the aircraft wing which has a length of 50% to 70% of wing chord, a should in no way limit this invention. However, a device thickness ratio of 8% and the nose portion of the device extends forward of the wing leading from 1% to 5% of its length has been found to be extremely satisfactory.

While the invention has been described in a single embodiment, it is to be understood that the words which have been used are words of description rather than of limitation and that changes within the scope of the appended claims may be made without departing from the true scope and spirit of the invention in its broader aspects.

We claim:

1. An aircraft comprising a fuselage, wings to be attached to the fuselage and extending transversely therefrom, each of said wings having a leading edge and a trailing edge the distance therebetween being the chord length, and an empennage consisting of horizontal stabilizers and a vertical stabilizer, the improvement comprising a device for controlling aircraft stall characteristics wherein:

said device comprises an aerodynamic airfoil body, said device to be fixedly mounted and solely confined to the underside of said wings and intersecting the underside of said wings along a substantial length of said airfoil body, the longitudinal axis of said body extending substantially parallel to the longitudinal axis of said fuselage, the longitudinal length of said body being 50% to 70% of said wing chord length, said body having a thickness ratio of approximately eight percent;

said body having a nose portion, said nose portion extending forward of the forwardmost point of the intersection of said device with said wings, said nose portion extending forward of the leading edge of said wings, the amount of extension forward of said wings leading edge being within the range of one percent to five percent of the longitudinal length of said body, whereby said nose portion will intersect the stagnation air streamline as the aircraft approaches stall; and as the aircraft passes through the air said body in combination with the aircraft wing creates a vortex which passes over the upper wing surface in such a manner to decrease the span-wise flow of the boundary layer of air on the wing surface thereby helping to prevent wing tip stall.

2. A device for controlling aircraft stall characteristics as defined in claim 1 wherein:

said aircraft having two wings, a device being mounted under each of said aircraft wings nearer said fuselage than the tips of said wings and in substantial longitudinal alignment with the tip portions of said horizontal stabilizers.

3. A device for controlling aircraft stall characteristics as defined in claim 2 wherein:

said empennage consists of two horizontal stabilizers each extending transversely from said vertical stabilizer, said horizontal stabilizer being connected to said vertical stabilizer at its upper extremity forming a T shape; and said vortex created by each of said devices passes beneath said horizontal stabilizers in such a manner as to improve the aircraft control characteristics at said empennage.

References Cited

UNITED STATES PATENTS

| | | | |
|---|---|---|---|
| 2,421,699 | 6/1947 | Johnson | 244—135 |
| 2,649,265 | 8/1953 | Grant | 244—91 |
| 2,885,161 | 5/1959 | Kerker et al. | 244—91 X |
| 3,139,248 | 6/1964 | Alvarez-Calderon | 244—42 |

OTHER REFERENCES

Jane's All The World's Aircraft, 1964–1965, McGraw-Hill Book Co., p. 129.

MILTON BUCHLER, *Primary Examiner.*

T. MAJOR, *Assistant Examiner.*